(12) United States Patent  (10) Patent No.: US 8,179,813 B2
Cheng et al.  (45) Date of Patent: May 15, 2012

(54) METHODS AND SYSTEMS FOR RANGING USING RANGING LOADING FACTOR

(75) Inventors: Steven D. Cheng, San Diego, CA (US); Patrick Lim, San Diego, CA (US); Tom Chin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 115 days.

(21) Appl. No.: 12/337,640

(22) Filed: Dec. 18, 2008

(65) Prior Publication Data

US 2010/0157820 A1    Jun. 24, 2010

(51) Int. Cl.
    *H04L 12/26* (2006.01)
(52) U.S. Cl. .................. 370/252; 370/331; 455/436
(58) Field of Classification Search .............. 370/252, 370/253, 206, 331, 335, 332; 455/436–444, 455/453
See application file for complete search history.

(56) References Cited

U.S. PATENT DOCUMENTS

| 7,065,063 | B2 * | 6/2006 | Tran ............................ 370/332 |
| 2004/0185852 | A1 | 9/2004 | Son et al. |
| 2005/0164709 | A1 * | 7/2005 | Balasubramanian et al. ............................ 455/453 |
| 2005/0201331 | A1 | 9/2005 | Gaal et al. |
| 2006/0003774 | A1 * | 1/2006 | Byun et al. .................. 455/453 |
| 2008/0233961 | A1 * | 9/2008 | Cho et al. ...................... 455/436 |
| 2009/0097454 | A1 * | 4/2009 | Yeou et al. .................... 370/332 |
| 2009/0137251 | A1 * | 5/2009 | Ji et al. ......................... 455/437 |
| 2009/0298504 | A1 * | 12/2009 | Lee et al. ..................... 455/437 |

FOREIGN PATENT DOCUMENTS

EP    1156623 A1    11/2001

OTHER PUBLICATIONS

International Search Report and Written Opinion—PCT/US2009/067550—International Search Authority—European Patent Office—Apr. 14, 2010.

* cited by examiner

*Primary Examiner* — Gary Mui
(74) *Attorney, Agent, or Firm* — Milan I. Patel; Tyler J. Overall (57) ABSTRACT

Methods and apparatus for indicating a base station's amount of ranging traffic to a mobile station (MS) and for selecting a base station (BS) for performing ranging based on the ranging traffic indication are provided. This notification may occur via a ranging loading parameter, such as a ranging loading factor (RLF) indicating the ratio of used ranging slots to available ranging slots, transmitted as a new TLV (Type-Length-Value) within the Uplink Channel Descriptor (UCD) of a (potential) serving BS or in the UCD of a Neighbor Advertisement (MOB_NBR-ADV) message for a neighbor BS. By selecting a BS with a certain level of unused ranging slots, the MS may exponentially decrease the ranging overhead (i.e., the average waiting time for the ranging procedures) when compared to a conventional MS that does not consider a BS's ranging overload when trying to perform ranging with the BS.

70 Claims, 8 Drawing Sheets

METHODS AND SYSTEMS FOR RANGING USING RANGING LOADING FACTOR

TECHNICAL FIELD

Certain embodiments of the present disclosure generally relate to wireless communications and, more particularly, to selecting a suitable base station (BS) based on ranging traffic information in an effort to reduce the average waiting time during the ranging procedure.

SUMMARY

Certain embodiments of the present disclosure generally relate to providing an MS with a quantitative indication of a BS's ranging traffic such that the MS can make an informed decision whether to select this BS or another BS for performing ranging such that the BS selected for ranging may most likely have a number of unused ranging slots that is acceptable to the MS. In this manner, the ranging overhead (i.e., the average waiting time during the ranging procedures) may be decreased.

Certain embodiments of the present disclosure provide a method for selecting, by a mobile station, a BS for performing ranging operations. The method generally includes receiving one or more ranging loading parameters indicative of an amount of ranging traffic for one or more candidate BSs; selecting the BS, from the candidate BSs, on which to perform ranging based, at least in part, on the ranging loading parameters; and performing the ranging operations with the selected BS.

Certain embodiments of the present disclosure provide a computer-program product for selecting, by a mobile station, a BS for performing ranging operations. The computer-program product typically includes a computer-readable medium having instructions stored thereon, the instructions being executable by one or more processors. The instructions generally include instructions for receiving one or more ranging loading parameters indicative of an amount of ranging traffic for one or more candidate BSs; instructions for selecting the BS, from the candidate BSs, on which to perform ranging based, at least in part, on the ranging loading parameters; and instructions for performing the ranging operations with the selected BS.

Certain embodiments of the present disclosure provide an apparatus for selecting a BS for performing ranging operations. The apparatus generally includes means for receiving one or more ranging loading parameters indicative of an amount of ranging traffic for one or more candidate BSs; means for selecting the BS, from the candidate BSs, on which to perform ranging based, at least in part, on the ranging loading parameters; and means for performing the ranging operations with the selected BS.

Certain embodiments of the present disclosure provide a mobile device. The mobile device generally includes a receiver front end configured to receive one or more ranging loading parameters indicative of an amount of ranging traffic for one or more candidate base stations (BSs); logic for selecting a base station (BS), from the candidate BSs, on which to perform ranging based, at least in part, on the ranging loading parameters; and logic for performing the ranging operations with the selected BS.

Certain embodiments of the present disclosure provide a method for indicating, to a mobile station (MS), an amount of ranging traffic for a BS. The method generally includes determining the amount of ranging traffic for the BS and transmitting a ranging loading parameter indicative of the amount of ranging traffic for the BS.

Certain embodiments of the present disclosure provide a computer-program product for indicating, to an MS, an amount of ranging traffic for a BS. The computer-program product typically includes a computer-readable medium having instructions stored thereon, the instructions being executable by one or more processors. The instructions generally include instructions for determining the amount of ranging traffic for the BS and instructions for transmitting a ranging loading parameter indicative of the amount of ranging traffic for the BS.

Certain embodiments of the present disclosure provide an apparatus for indicating, to an MS, an amount of ranging traffic for a BS. The apparatus generally includes means for determining the amount of ranging traffic for the BS and means for transmitting a ranging loading parameter indicative of the amount of ranging traffic for the BS.

Certain embodiments of the present disclosure provide a first BS for indicating, to an MS, an amount of ranging traffic for a second BS. The first BS generally includes logic for determining the amount of ranging traffic for the second BS and a transmitter front end configured to transmit a ranging loading parameter indicative of the amount of ranging traffic for the second BS.

Certain embodiments, as presented wihtin this disclosure, including one or more of these summary paragraphs, can include performing the ranging operations consistent with one or more standards of the Institute of Electrical and Electronics Engineers (IEEE) 802.16 family of standards.

Certain embodiments, as presented wihtin this disclosure, including one or more of these summary paragraphs, can include transmitting the ranging loading parameter consistent with one or more standards of the Institute of Electrical and Electronics Engineers (IEEE) 802.16 family of standards.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Orthogonal frequency-division multiplexing (OFDM) and orthogonal frequency division multiple access (OFDMA) wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations.

According to IEEE 802.16, ranging may be performed at initialization and periodically to determine network delay and to request power and/or downlink burst profile change. For example, initial ranging procedures may be performed during network entry or network re-entry from idle mode. Periodic ranging procedures may be performed to stay current with changes to the network delay, the channel-to-interference-plus-noise ratio (CINR), and the Quality of Service (QoS), for example. And handover ranging procedures may be performed when ranging against a target BS during handover or when updating the location of a mobile station (MS) during idle mode.

Certain embodiments of the present disclosure provide methods and apparatus for indicating a base station's amount of ranging traffic to a mobile station (MS) and selecting a base station (BS) for performing ranging based on the ranging traffic indication. This notification may occur via a ranging loading parameter, such as a ranging loading factor (RLF) indicating the ratio of used ranging slots to available ranging slots, transmitted as a new TLV (Type-Length-Value) within the Uplink Channel Descriptor (UCD) of a (potential) serving BS or in the UCD of a Neighbor Advertisement (MOB_NBR-ADV) message for a neighbor BS. By selecting a BS with a certain level of unused ranging slots, the MS may exponentially decrease the ranging overhead (i.e., the average waiting time for the ranging procedures) when compared to a conventional MS that does not consider a BS's ranging overload when trying to perform ranging with the BS.

Although certain embodiments of the present disclosure are described with respect to WiMAX, many of these embodiments may also be applied to any suitable wireless standard, such as 2G (Second Generation), 3G (Third Generation), and other types of 4G (Fourth Generation) besides WiMAX.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
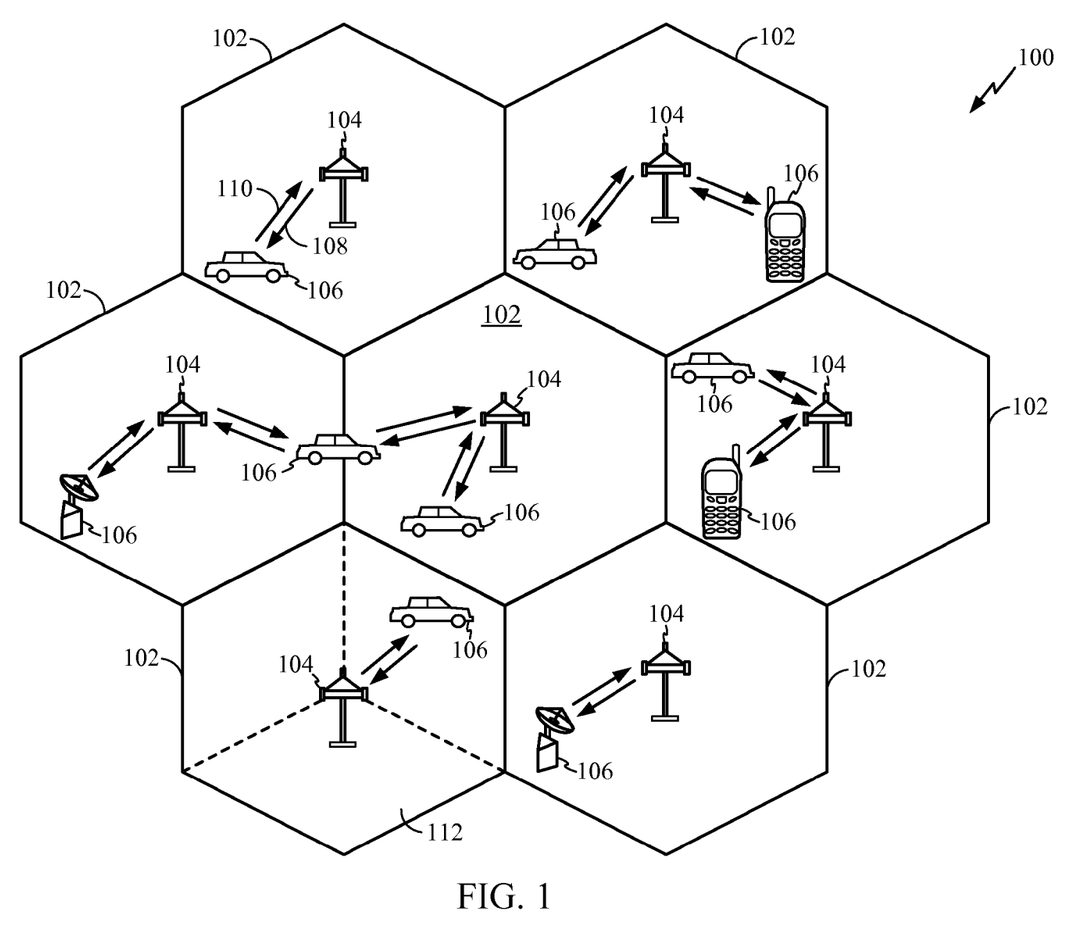
FIG. 1 illustrates an example wireless communication system, in accordance with certain embodiments of the present disclosure.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
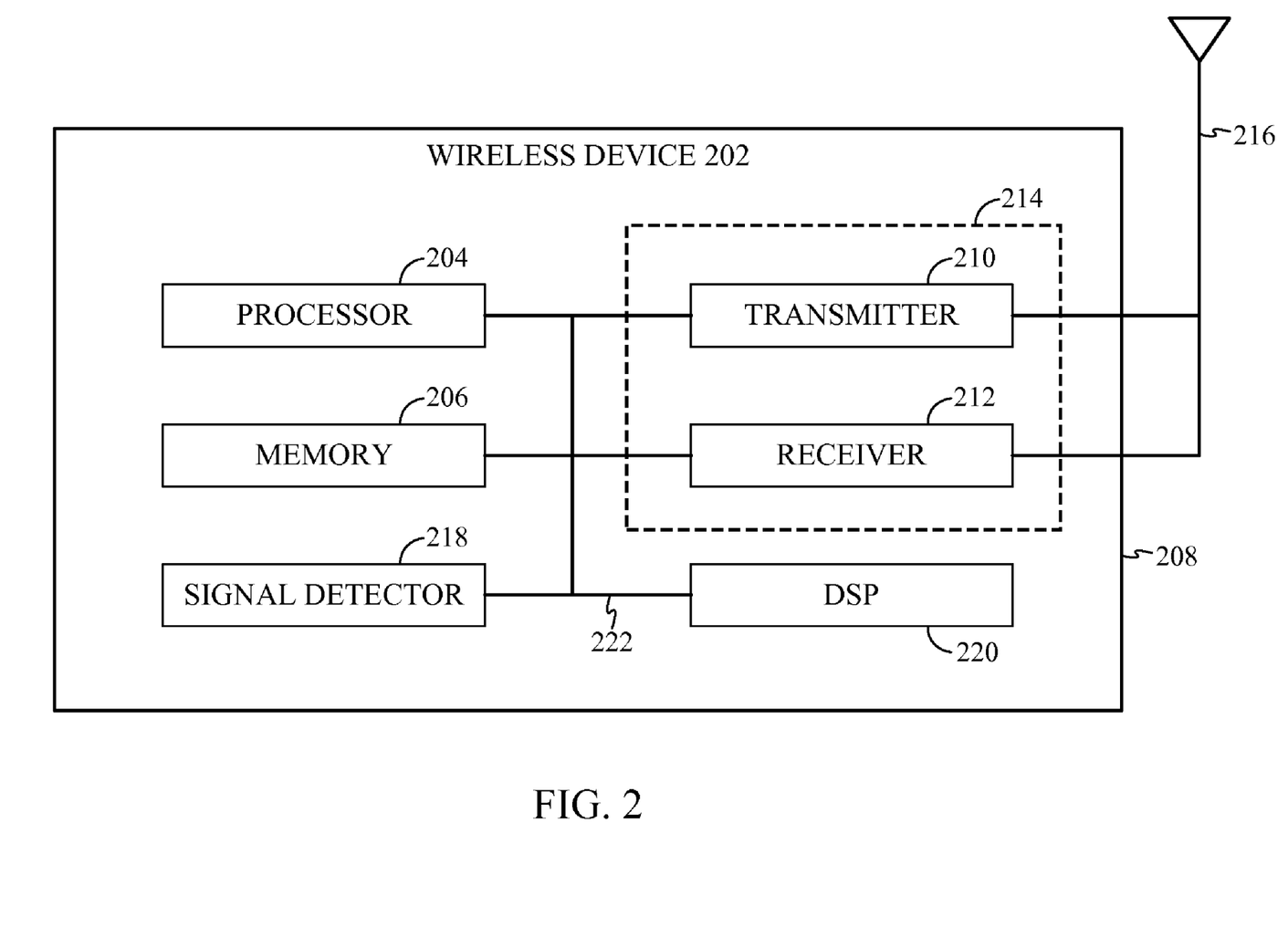
FIG. 2 illustrates various components that may be utilized in a wireless device, in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
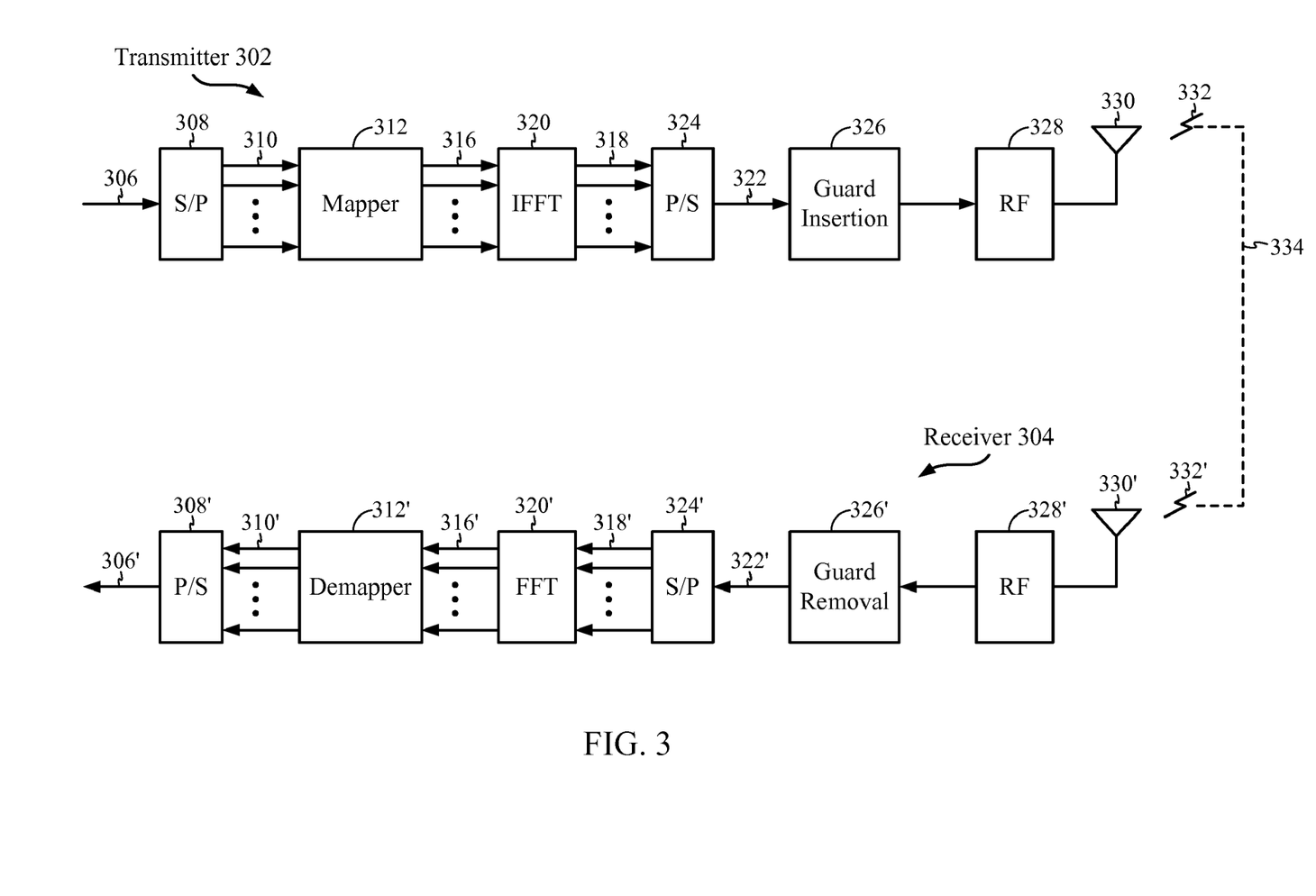
FIG. 3 illustrates an example transmitter and an example receiver that may be used within a wireless communication system that utilizes orthogonal frequency-division multiplexing and orthogonal frequency division multiple access (OFDM/OFDMA) technology, in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary OFDM/OFDMA Frame

Figure 4:
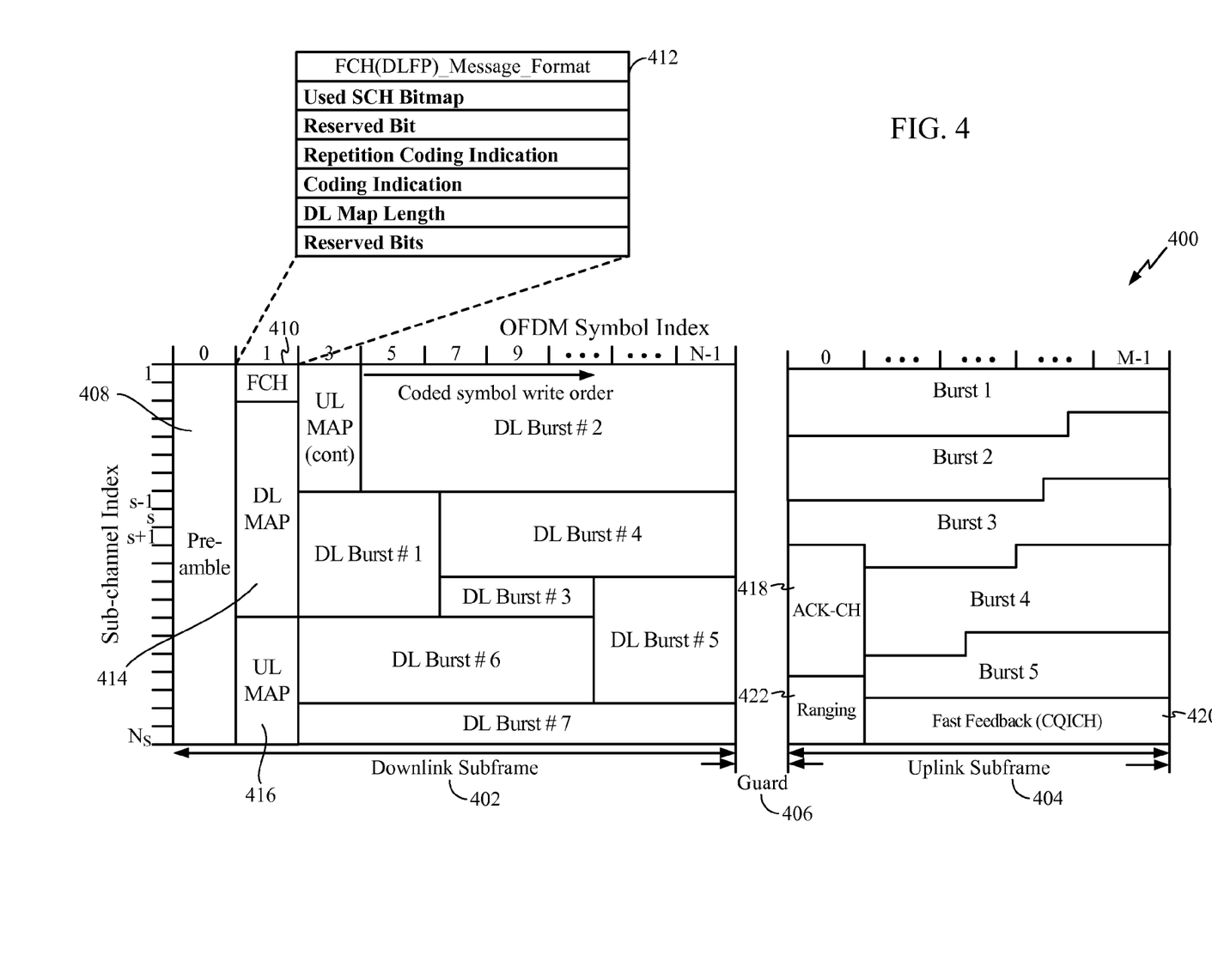
FIG. 4 illustrates an example OFDM/OFDMA frame for Time Division Duplex (TDD), in accordance with certain embodiments of the present disclosure.

Referring now to FIG. 4, an OFDM/OFDMA frame 400 for a Time Division Duplex (TDD) implementation is depicted as a typical, but not limiting, example. Other implementations of an OFDM/OFDMA frame, such as Full and Half-Duplex Frequency Division Duplex (FDD) may be used, in which case the frame is the same except that both downlink (DL) and uplink (UL) messages are transmitted simultaneously over different carriers. In the TDD implementation, each frame may be divided into a DL subframe 402 and a UL subframe 404, which may be separated by a small guard interval 406— or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/OFDMA frame 400, various control information may be included. For example, the first OFDM/OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 2 is to be used.

A Frame Control Header (FCH) 410 may follow the preamble 408. The FCH 410 may provide frame configuration information, such as the usable subchannels, the modulation and coding scheme, and the MAP message length for the current OFDM/OFDMA frame. A data structure, such as the downlink Frame Prefix (DLFP) 412, outlining the frame configuration information may be mapped to the FCH 410.

The DLFP 412 for Mobile WiMAX may comprise six bits for the used subchannel (SCH) bitmap, a reserved bit set to 0, two bits for the repetition coding indication, three bits for the coding indication, eight bits for the MAP message length, and four reserved bits set to 0 for a total of 24 bits in the DLFP 412. Before being mapped to the FCH 410, the 24-bit DLFP may be duplicated to form a 48-bit block, which is the minimal forward error correction (FEC) block size.

Following the FCH 410, a DL-MAP 414 and a UL-MAP 416 may specify subchannel allocation and other control information for the DL and UL subframes 402, 404. In the case of OFDMA, multiple users may be allocated data regions within the frame, and these allocations may be specified in the DL and UL-MAP 414, 416. The MAP messages may include the burst profile for each user, which defines the modulation and coding scheme used in a particular link. Since MAP messages contain critical information that needs to reach all users, the DL and UL-MAP 414, 416 may often be sent over a very reliable link, such as BPSK or QPSK with rate ½ coding and repetition coding. The DL subframe 402 of the OFDM/OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe 404 may include UL bursts of various bit lengths composed of the uplink data being communicated. Therefore, the UL-MAP 416, transmitted as the first burst in the downlink subframe 402, may contain information about the location of the UL burst for different users. The UL subframe 404 may include additional control information as illustrated in FIG. 4. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel state information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

Exemplary Potential Ranging Bottlenecks

When ranging, a user terminal 106, such as an MS, may use a UL ranging channel, for example, or another suitable portion of the UL subframe 404 to transmit a ranging request message or code, such as a RNG-REQ message. The RNG-REQ message may use an initial ranging connection identifier (CID)-if the MS is attempting to join the network or is changing downlink channels-or a basic CID identifying the MS transmitting the ranging request. In response, the BS 104 receiving the RNG-REQ may return a corresponding ranging response (RNG-RSP) message directed to the MS by including the basic CID or the MAC address of the MS. The RNG-RSP message may include adjustment information (e.g., time, power, and possibly frequency corrections) and a status notification.

In the case of OFDMA-based ranging according to the IEEE 802.16e-2005 standard, the MS may randomly choose a ranging slot and a ranging code. The ranging slot for OFDMA-based ranging may be in the UL allocation dedicated for that purpose, instead of in contention slots for RNG-REQ messages. After decoding a UL-MAP 416 with a transmission opportunity (TO) for ranging, the MS may transmit the ranging code to the BS 104 as a code-division multiple access (CDMA) code. Because the BS 104 cannot tell which MS sent the CDMA ranging code, the BS may broadcast a RNG-RSP message that advertises the received ranging code as well as the ranging slot (OFDMA symbol number, subchannel, frame number, etc.) where the CDMA ranging code has been identified. This information is used by the MS that sent the CDMA code to identify the RNG-RSP message that corresponds to that particular MS's ranging request. Once the BS 104 receives a CDMA code that results in sending a RNG-RSP message with a success status, the BS provides bandwidth allocation for the MS using a CDMA_Allocation_IE. Once the MS receives a UL-MAP 416 with the CDMA_Allocation_IE, the MS may send a RNG-REQ message as described above, using the allocated bandwidth according to the allocation information element (IE). The ranging process may conclude after the MS receives a RNG-RSP message, which includes a valid basic CID.

If the RNG-RSP message is not received by the MS after a timeout T3 (T3=200 ms in the IEEE 802.16e-2005 standard), the MS may perform a random backoff, may adjust the power level for transmitting the CDMA ranging code, and may then wait for another transmission opportunity (TO) to resend the ranging request. The timeout T3 may occur because the CDMA codes from multiple MSs collided or were not correctly received by the BS 104. Such collisions leading to backoff procedures may typically occur in an area crowded with many mobile stations attempting to perform ranging at the same time. For example, such ranging congestion may happen in a large stadium or other sports arena during an event break time (e.g., halftime at a football game) when many mobile users may attempt to make a call at the same time. Because this congestion represents a transient anomaly in normal usage, network operators typically do not deploy a large number of BSs near such an area to meet this short-lived demand.

As a result, all of the MSs may concentrate on a single BS that is closest to the event site, and even though a BS 104 can serve multiple MSs within the same OFDM/OFDMA frame 400, the number of accepted ranging requests is limited by this frame's transmission opportunities. Due to the significant number of mobile users, a majority of the MSs may most likely fail to camp on the closest BS, even after a number of retries, and most of the MSs failing to camp on this BS may not try ranging with another BS until such an MS reaches its contention ranging retries limit. In WiMAX, this indicates that an MS may have to wait for sixteen T3 timeout values, or over three seconds (16*200 ms=3.2 s), before attempting to perform ranging with another BS.

The greater the number of MSs attempting to perform ranging with the same BS at the same time, the more the average waiting time to successfully complete ranging on the same BS increases. In fact, it follows from the Poisson Distribution Theorem that the average waiting time will increase exponentially with the ranging traffic according to the Poisson Distribution Theorem.

Accordingly, it may be desirable to notify an MS of the current ranging traffic and/or ranging overload condition of a BS 104. In this manner, the MS may have the option of using the ranging traffic information to select a BS that is not overloaded with which to perform ranging, thereby decreasing the ranging overhead (i.e., the average waiting time during ranging). Certain embodiments of the present disclosure utilize a broadcast ranging loading parameter indicating the ranging loading of a particular BS (and possibly the ranging loading parameter of one or more neighbor BSs) to accomplish this objective.

Exemplary BS Selection for Ranging Based on Ranging Loading

Figure 5:
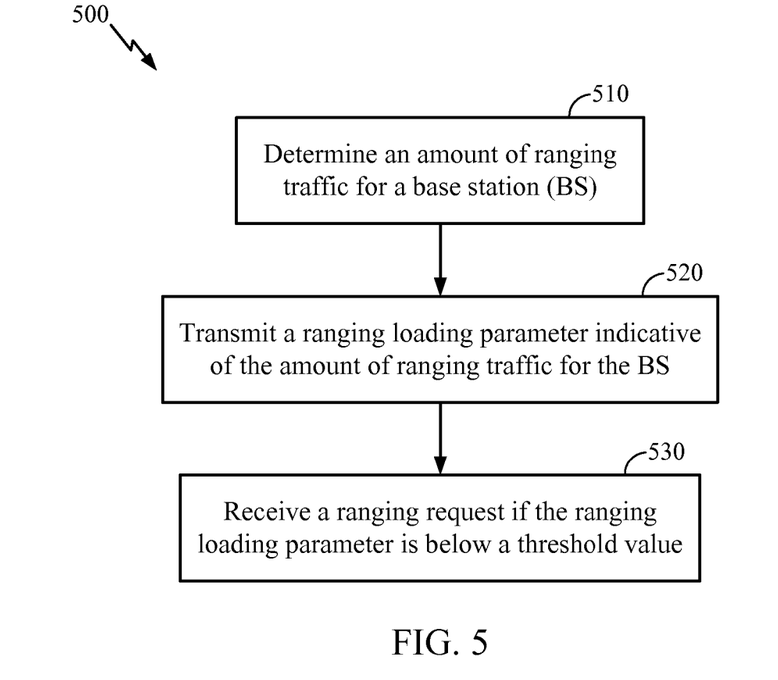
FIG. 5 is a flow diagram of example operations, from the perspective of a base station (BS), for indicating, to a mobile station (MS), an amount of ranging traffic for the same and/or another BS, in accordance with certain embodiments of the present disclosure.

FIG. 5 is a flow diagram of example operations 500, from the perspective of a BS 104, for indicating, to an MS, an amount of ranging traffic for the same and/or another BS. The operations 500 may begin, at 510, by determining an amount of ranging traffic for a BS, which may be the same BS and/or another BS. For example, a serving BS may determine its own amount of ranging traffic and/or the ranging traffic for one or more neighbor BSs at 510. For certain embodiments, the ranging traffic determined may be the instant ranging traffic.

In order to determine the amount of ranging traffic for a BS at 510, the BS may determine the number of ranging slots available for this BS and the number of ranging slots currently being used. For some embodiments, the BS may determine the number of unused ranging slots by subtracting the number of ranging slots being used from the number of available ranging slots, for example. The BS may determine a ranging loading parameter, such as a ranging loading factor (RLF), indicative of the amount of ranging traffic. The RLF may be defined as the number of ranging slots being used divided by the number of ranging slots available for a given ranging type (e.g., used initial ranging slots divided by available initial ranging slots). The RLF may be defined for an instant or over an observation period. The RLF may be expressed as a decimal result of the division, a percentage, a fraction, a ratio, or any other suitable means for comparison. For some embodiments, the BS may determine an RLF for each of its ranging regions. For certain embodiments where a first BS determines the amount of ranging traffic for a second BS, the network may provide the ranging traffic information (e.g., expressed as an RLF) for the second BS to the first BS along the network backbone, for example.

At 520, the BS 104 may transmit the ranging loading parameter (e.g., the RLF, the RLF per ranging region, the number of unused ranging slots, or the number of unused ranging slots divided by the number of available ranging slots, expressed as a decimal result of the division, a percentage, a fraction, a ratio, etc.) to indicate the amount of ranging traffic for the same and/or another BS. For example, a new TLV (Type-Length-Value) field for the ranging loading parameter may be introduced into the Uplink Channel Descriptor (UCD), which is broadcast by the BS 104. By including the ranging loading parameter in the UCD, any MS that can decode the FCH 410, the DL-MAP 414, the UL-MAP 416, the Downlink Channel Descriptor (DCD), and the UCD may be able to receive the ranging traffic information from the BS. For some embodiments, the BS 104 may only transmit the ranging loading parameter when the BS is ranging overloaded, but does not include the ranging loading parameter in the UCD at other times.

Furthermore, the UCD(s) for one or more neighbor BSs may be transmitted along the network backbone to the BS. If the ranging loading parameter is included in the UCD(s) of the neighbor BS(s), the BS 104 may transmit the ranging loading parameter(s) for the neighbor BS(s) in the Neighbor Advertisement (MOB_NBR-ADV) message, which includes these UCD(s). The MOB_NBR-ADV message is used to identify the network and define the characteristics of neighbor BSs to potential MSs seeking initial network entry or handover. In this manner, the ranging loading parameter(s) for a particular BS and the ranging loading parameter(s) of one or more neighbor BS(s) may be transmitted at 520.

At 530, the BS 104 that transmitted the ranging loading parameter(s) at 520 may receive a ranging request if the RLF, for example, for this particular BS (and ranging region) is below a threshold value (i.e., this BS is not overloaded with respect to ranging and has at least a certain number or a certain percentage of available ranging slots). Thresholding and ranging requesting according to certain embodiments of the present disclosure are described in greater detail below.

Figure 6:
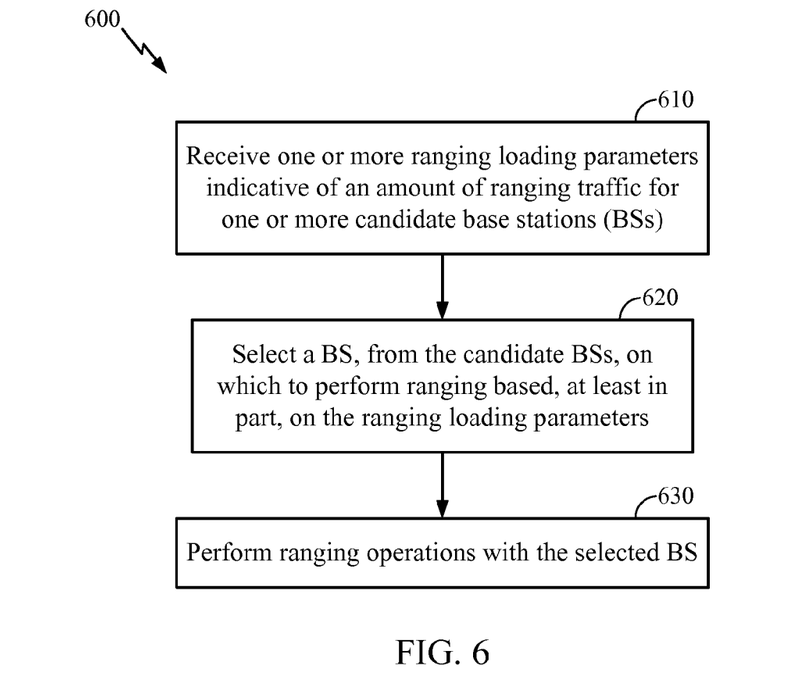
FIG. 6 is a flow diagram of example operations, from the perspective of an MS, for selecting a BS for performing ranging operations, in accordance with certain embodiments of the present disclosure.

FIG. 6 is a flow diagram of example operations 600, from the perspective of an MS, for selecting a BS 104 for performing ranging operations, in accordance with certain embodiments of the present disclosure. The operations 600 assume that the MS was able to decode the FCH 410, the DL-MAP 414, the DCD, the UL-MAP 416, and the UCD of a received OFDM/OFDMA frame 400. The operations 600 may begin, at 610, by receiving one or more ranging loading parameters indicative of an amount of ranging traffic for one or more candidate BSs. For example, the MS may receive an RLF or a number of unused ranging slots in the UCD of a serving BS. For certain embodiments, the MS may also receive a MOB_NBR-ADV message containing the RLF(s) or other ranging loading parameter(s) in the UCD(s) of one or more neighbor BSs.

At 620, the MS may select a BS on which to perform ranging from among the candidate BSs. The selection may be based, at least in part, on the ranging loading parameters received at 610. For example, the MS may compare the RLF for a serving BS (and ranging region) with a predetermined threshold value. If the RLF of the serving BS is below the threshold value (i.e., the serving BS is not ranging overloaded), the MS may select the serving BS for ranging. However, if the RLF of the serving BS is at or above the threshold value (i.e., the serving BS is overloaded), the MS may select a neighbor BS for ranging, perhaps the neighbor BS with the lowest RLF. For certain embodiments, the MS may select the BS (and ranging region) with the best ranging loading parameter (e.g., the lowest RLF) from among the candidate BSs to perform ranging. For other embodiments, the MS may consider any combination of one or more other parameters—such as channel-to-interference-plus-noise ratio (CINR), Quality of Service (QoS), Received Signal Strength Indication (RSSI), round trip delay (RTD), scheduling service support, available resources-in addition to the ranging loading parameter when selecting the BS for ranging. Each of these parameters may hold a different weight in the MS's selection process.

At 630, the MS may perform ranging operations with the BS selected at 620. For example, the MS may transmit a RNG-REQ message or, in the case of OFDMA PHY, a CDMA ranging code to the selected BS to begin the ranging procedure. As illustrated in FIG. 5, the BS that transmitted the ranging loading parameter(s) to the MS may receive the ranging request at 530 if the transmitting BS is the BS selected at 620. The ranging operations may proceed as described above.

By selecting a BS for performing ranging using the ranging loading parameters as described above, an MS may be able to begin ranging with a BS that has a suitable number of unused ranging slots or switch from a ranging overloaded BS to a less congested BS. In this manner, the average waiting time spent in the ranging procedure (i.e., the ranging overhead) may be decreased exponentially according to the Poisson Distribution Theorem.

Furthermore, the number of random backoff algorithms—typically associated with an increase in the transmission power of the ranging request—that may be executed when trying to perform ranging with a congested BS may likewise decrease exponentially. An increase in ranging request transmission power will expend a greater amount of a mobile station's battery power. Therefore, an MS taking advantage of the ranging loading parameters to select a BS for ranging according to certain embodiments of the present disclosure may consume less battery power than a conventional MS.

An MS, such as a legacy MS, that does not recognize the ranging loading parameter in the UCD may ignore it. In this case, the MS may select a BS for performing ranging according to conventional methods, without considering the ranging traffic information for the BS(s).

Exemplary Initial Ranging Utilizing Ranging Loading

Now that selecting a BS for ranging based on the ranging loading parameter(s) received by an MS has been described for ranging in general, selecting a BS with respect to different types of ranging is described in greater detail below to further illustrate how the ranging loading parameter(s) may be utilized.

Figure 7:
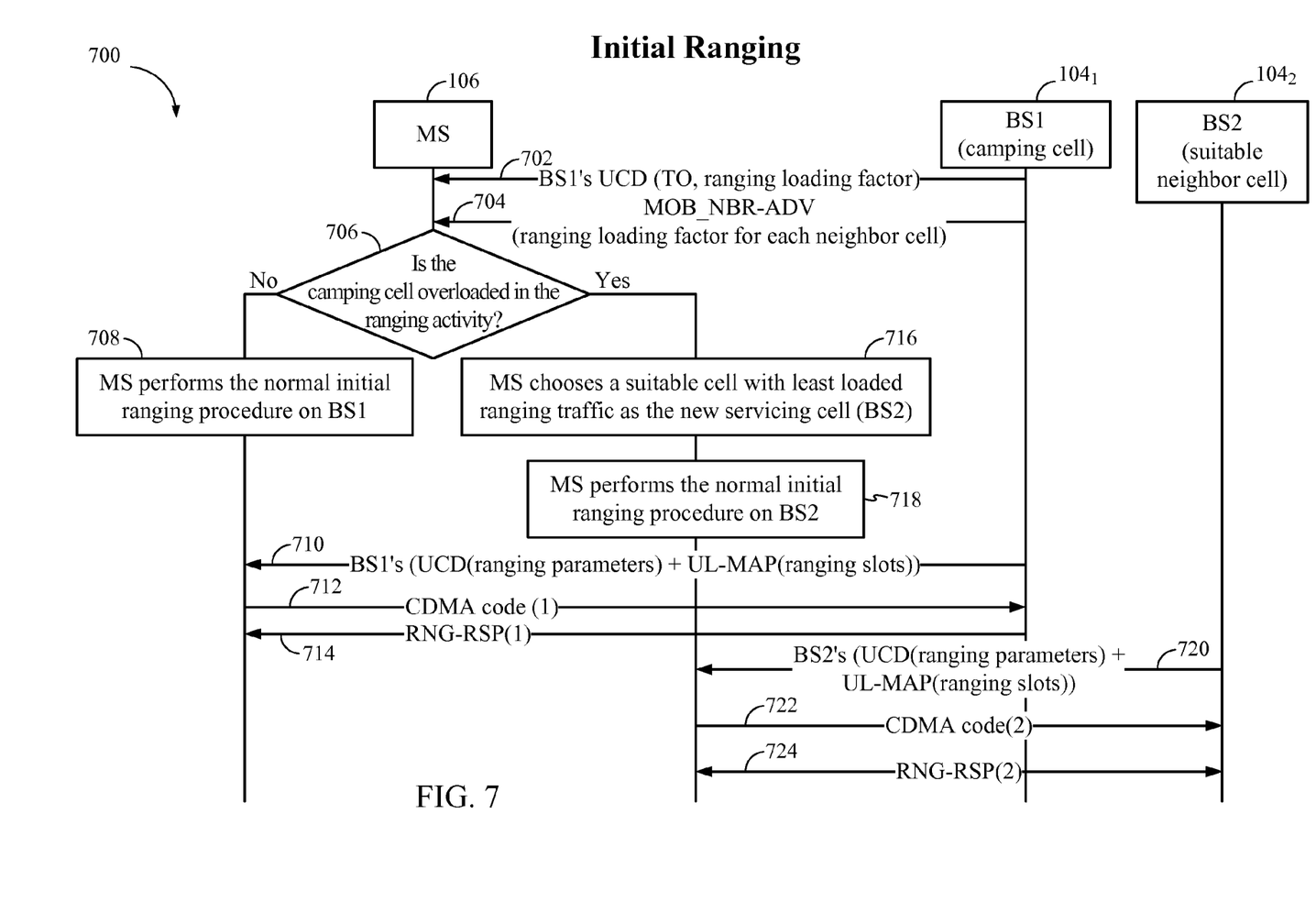
FIG. 7 illustrates an example call flow for selecting a BS from one or more candidate BSs for initial ranging after evaluating ranging loading parameters received from the candidate BSs, in accordance with certain embodiments of the present disclosure.

FIG. 7 illustrates an example call flow 700 for selecting a BS from one or more candidate BSs for initial ranging after evaluating ranging loading parameters received from the candidate BSs. Before initial ranging, the user terminal 106, such as the MS portrayed, may perform a power scan in an effort to identify all of the potential BSs with which the MS may communicate. From these potential BSs, the MS may choose a BS (e.g., BS1) as a potential serving BS on which to camp until the MS gains network entry or selects a different potential serving BS. The MS may synchronize with BS1 using the preamble 408 of an OFDM/OFDMA frame 400 and, at 702, may attempt to decode the OFDM/OFDMA symbols received from BS1 including the FCH 410, the DL-MAP 414, the DCD, the UL-MAP 416, and the UCD in an effort to identify whether BS1 is a suitable BS for ranging. If the MS fails to decode the FCH 410, the DL-MAP 414, the DCD, the UL-MAP 416, and the UCD in a given time, the MS may consider switching to a different BS as a new potential serving BS. After the MS is able to decode these messages from the potential serving BS (e.g., BS1), the MS may either decode the MOB_NBR-ADV message, at 704, from broadcast and primary management channels to obtain the neighbor BS information or ascertain the neighbor BS information from the spectrum scan process.

The UCD transmitted at 702 may include one or more transmission opportunities, channel information, preamble signals, and a ranging loading parameter (e.g., an RLF as described above) indicating the instant ranging traffic for BS1. The MOB_NBR-ADV message transmitted by BS1 at 704 may include the ranging loading parameter(s) indicating the instant ranging traffic for one or more neighbor BSs suitable for ranging, such as BS2.

At 706, the MS may determine whether the camping BS (e.g., BS1) is overloaded with respect to ranging based on the ranging loading parameter included in the UCD. For example, if the RLF for BS1 is above a threshold value for two consecutive UCD time frames, then the MS may determine that BS1 is ranging overloaded.

If BS1 is not ranging overloaded at 706 (i.e., the RLF is below the threshold value), then the MS may perform initial ranging on BS1 at 708. For OFDMA-based ranging, for example, the MS may receive BS1's ranging parameters in the UCD and BS1's ranging slots in the UL-MAP 416 transmitted at 710. The MS may transmit a CDMA initial ranging code to BS1 at 712. In response at 714, BS1 may broadcast a RNG-RSP message that advertises the received CDMA code as well as the ranging slot (OFDMA symbol number, subchannel, frame number, etc.) where the CDMA initial ranging code has been identified. The remaining OFDMA-based ranging procedures may proceed as described above.

However, if BS1 is ranging overloaded at 706, the MS may suffer from a long average waiting time if the MS decides to continue attempting initial ranging with BS1. Therefore, the MS may opt to select a suitable neighbor BS for ranging, such as a neighbor BS (e.g., BS2) with a better ranging loading parameter (e.g., a lower RLF) at 716. For certain embodiments, the MS may choose the neighbor BS with the best ranging loading parameter (e.g., the lowest RLF) as the new potential serving BS.

At 718, the MS may perform initial ranging on the new potential serving BS (e.g., BS2) after leaving the camping BS (e.g., BS1) and synchronizing with the new potential serving BS. For OFDMA-based ranging, for example, the MS may receive BS2's ranging parameters in the UCD and BS2's ranging slots in the UL-MAP 416 transmitted at 720. The MS may transmit a CDMA initial ranging code to BS2 at 722. In response at 724, BS2 may broadcast a RNG-RSP message that advertises the received CDMA code as well as the ranging slot where the CDMA initial ranging code has been identified. The remaining OFDMA-based ranging procedures may proceed as described above.

Exemplary Handover Ranging Utilizing Ranging Loading

For various reasons, such as a mobile station moving away from the area covered by one base station and entering the area covered by another, a handover (also known as a handoff)

may be performed to transfer communication services (e.g., an ongoing call or data session) from one base station to another.

Figure 8:
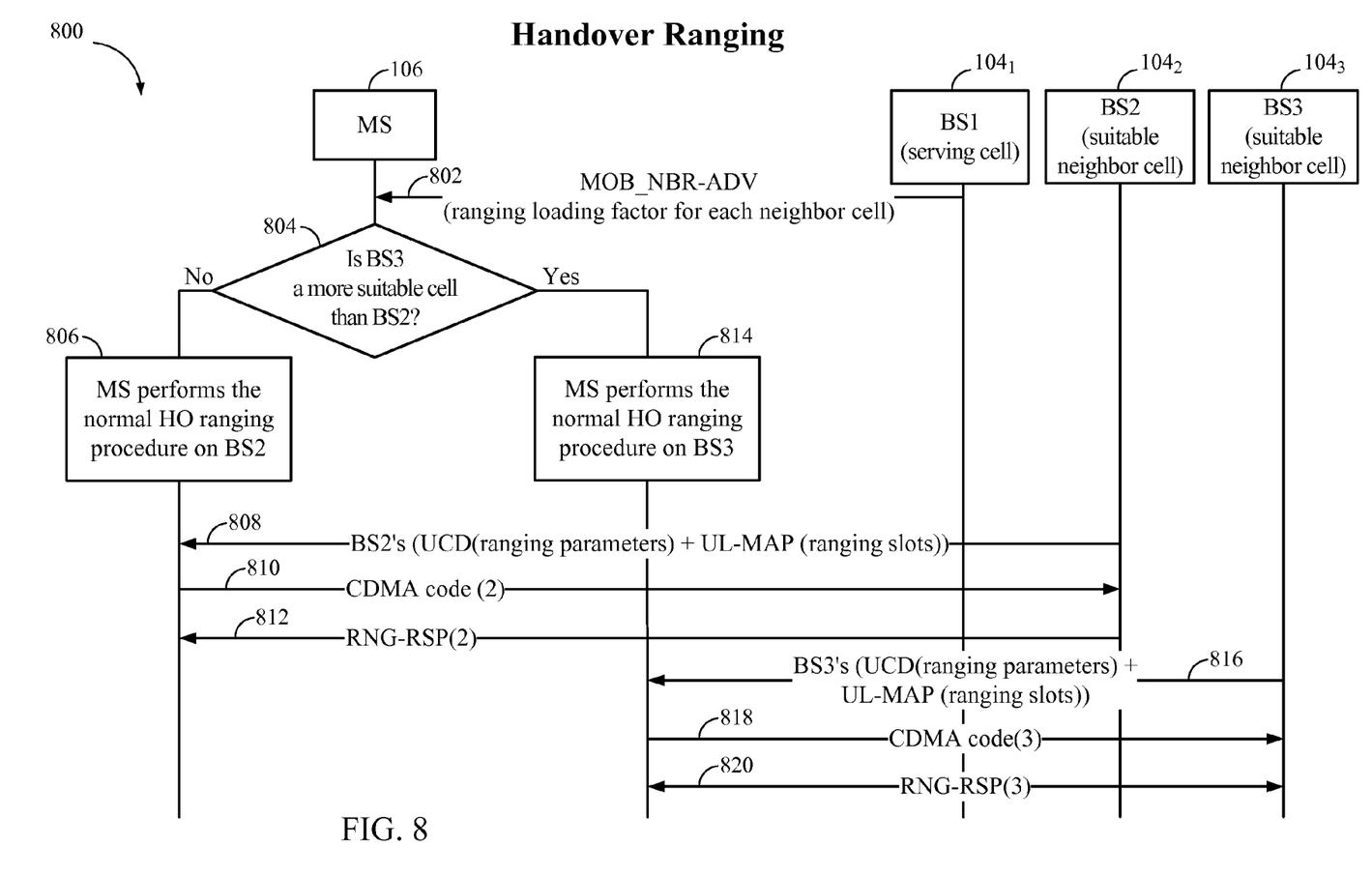
FIG. 8 illustrates an example call flow for selecting a BS from one or more candidate BSs for handover ranging after evaluating ranging loading parameters, among other factors, received from the candidate BSs, in accordance with certain embodiments of the present disclosure.

FIG. 8 illustrates an example call flow 800 for selecting a BS from one or more candidate BSs for handover ranging after evaluating ranging loading parameters, among other factors, received from the candidate BSs, in accordance with certain embodiments of the present disclosure. In the call flow 800, BS1 is the serving BS for the user terminal 106, such as the MS depicted. At 802, BS1 may transmit a MOB_NBR-ADV message comprising the ranging loading parameter(s) for one or more neighbor BSs. The ranging loading parameter(s) may be contained in the UCD(s) for the neighbor BSs included in the MOB_NBR-ADV message.

At 804, the MS may determine which of the neighbor BSs is the most suitable for handover. For example, the MS may determine whether neighbor BS2 is more suitable than neighbor BS3 or vice versa. In determining the most suitable neighbor BS candidate for handover, the MS may consider one or more other parameters, such as channel-to-interference-plus-noise ratio (CINR) or Quality of Service (QoS), in addition to the ranging loading parameter when selecting the BS for handover ranging. Each of these parameters may hold a different weight in the MS's selection process. For example, the MS may select a BS with a better CINR and a worse ranging loading parameter over a BS with a comparatively worse CINR and a better ranging loading parameter.

For the two neighbor BSs shown in FIG. 8, if BS2 is a more suitable BS than BS3 for handover, then the MS may perform the normal handover (HO) ranging procedure on BS2 at 806. For OFDMA-based ranging, for example, the MS may receive BS2's ranging parameters in the UCD and BS2's ranging slots in the UL-MAP 416 transmitted at 808. The MS may transmit a CDMA HO ranging code, selected from the handover-ranging domain, to BS2 at 810. In response at 812, BS2 may broadcast a RNG-RSP message that advertises the received CDMA code as well as the ranging slot (OFDMA symbol number, subchannel, frame number, etc.) where the CDMA HO ranging code has been identified. The remaining OFDMA-based ranging procedures may proceed as described above.

However, if BS3 is a more suitable BS than BS2 for handover, then the MS may perform the normal HO ranging procedure on BS3 at 814. For OFDMA-based ranging, for example, the MS may receive BS3's ranging parameters in the UCD and BS3's ranging slots in the UL-MAP 416 transmitted at 816. The MS may transmit a CDMA HO ranging code to BS3 at 818. In response at 820, BS3 may broadcast a RNG-RSP message that advertises the received CDMA code as well as the ranging slot (OFDMA symbol number, subchannel, frame number, etc.) where the CDMA HO ranging code has been identified. The remaining OFDMA-based ranging procedures may proceed as described above.

Exemplary Periodic Ranging Utilizing Ranging Loading

The MS may conduct periodic ranging in an effort to stay current with any changes in the network delay and/or the CINR. The MS may continually receive the current serving BS's UCD containing the ranging loading factor. As long as the MS can decode the UCD and the ranging loading factor is acceptable to the MS, the MS may continue to perform periodic ranging with the serving BS. However, when the MS fails to perform the periodic ranging procedure with the current serving BS or when the ranging loading parameter from the serving BS becomes unacceptable to the MS, the MS may consider the MOB_NBR-ADV message received from the serving BS in an earlier OFDM/OFDMA frame. This MOB_NBR-ADV message may contain each neighbor BS's ranging loading parameter. From this information, the MS may perform handover ranging as described above with respect to FIG. 8, for example, considering the ranging loading parameter when determining a suitable neighbor BS for handover.

Exemplary Idle Mode Ranging Utilizing Ranging Loading

Moreover, the MS may perform ranging when in the idle mode. There are two types of idle mode ranging: network entry and location update. For network entry, the MS may perform the initial ranging procedures as described above with respect to FIG. 7, for example, except that the MS has already acquired the neighbor BS list from the MOB_NBR-ADV message received before the MS went into idle mode. For location updating during idle mode, the MS may perform the handover ranging procedures as described above with respect to FIG. 8, for example.

Overview

The methods described above provide a network-assisted scheme for notifying an MS of a ranging loading parameter indicative of an amount of ranging traffic for a serving BS and potentially one or more neighbor BSs. In this manner, the MS may attempt to perform ranging with a BS having a certain number or percentage of unused ranging slots such that the BS is almost sure to have an unused ranging slot for the MS, thereby decreasing the average waiting time during the ranging procedures. Furthermore, the battery consumption of the MS during ranging may be reduced, as well.

Figure 5A:
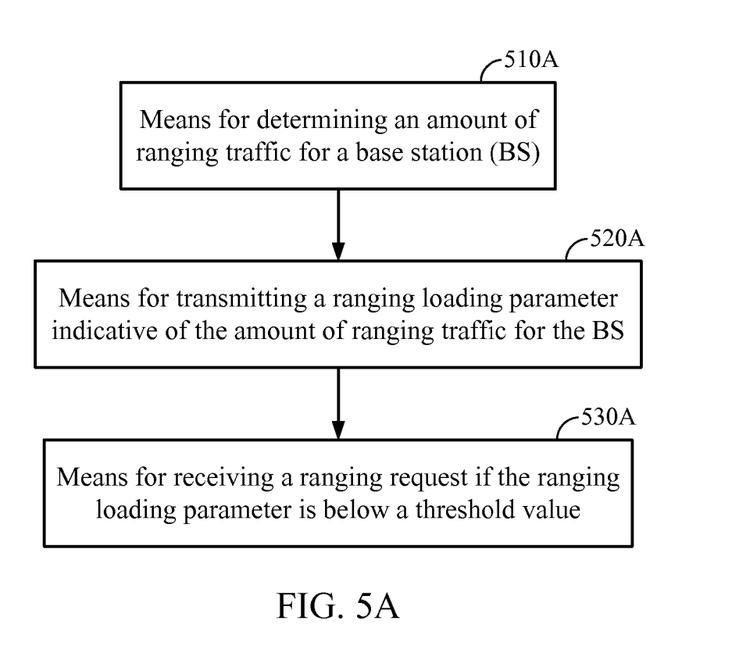
FIG. 5A is a block diagram of means corresponding to the example operations of FIG. 5 for indicating an amount of ranging traffic for the same and/or another BS, in accordance with certain embodiments of the present disclosure.
Figure 6A:
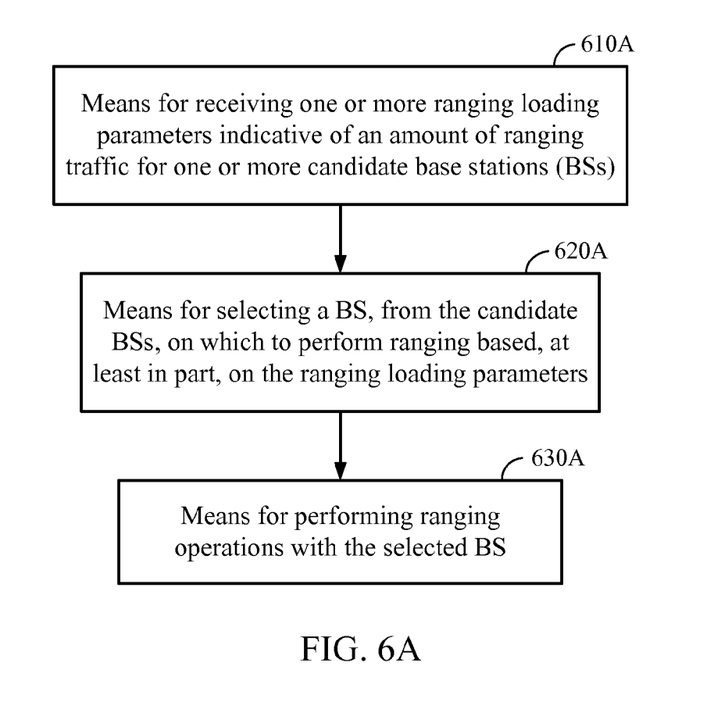
FIG. 6A is a block diagram of means corresponding to the example operations of FIG. 6 for selecting a BS for performing ranging operations, in accordance with certain embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 510-530 illustrated in FIG. 5 correspond to means-plus-function blocks 510A-530A illustrated in FIG. 5A, and blocks 610-630 illustrated in FIG. 6 correspond to means-plus-function blocks 610A-630A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Information and signals may be represented using any of a variety of different technologies and techniques. For example, data, instructions, commands, information, signals, and the like that may be referenced throughout the above description may be represented by voltages, currents, electromagnetic waves, magnetic fields or particles, optical fields or particles, or any combination thereof.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by one or more processors, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for selecting, by a mobile station, a base station (BS) for performing ranging operations, comprising:
   receiving one or more ranging loading parameters indicative of an amount of ranging traffic for one or more candidate BSs;
   selecting the BS, from the candidate BSs, on which to perform ranging based, at least in part, on the ranging loading parameters, wherein the selecting comprises selecting a BS with at least one of the ranging loading parameters below a threshold value; and
   performing the ranging operations with the selected BS.

2. The method of claim 1, wherein the ranging loading parameters comprise one ranging loading parameter for each of the candidate BSs.

3. The method of claim 2, wherein the ranging loading parameter comprises a ranging loading factor representative of a number of used ranging slots divided by a number of available ranging slots.

4. The method of claim 2, wherein the ranging loading parameter comprises a number or a percentage of unused ranging slots.

5. The method of claim 1, wherein the ranging loading parameters comprise one ranging loading parameter for each ranging region of the candidate BSs and wherein selecting the BS comprises selecting the BS and the ranging region of the BS on which to perform ranging based, at least in part, on the ranging loading parameters.

6. The method of claim 1, wherein selecting the BS comprises:
   determining whether a serving BS is ranging overloaded based on a ranging loading parameter for the serving BS;
   selecting the serving BS as the BS on which to perform ranging if the serving BS is not ranging overloaded; and
   if the serving BS is ranging overloaded, selecting a neighbor BS from the candidate BSs as the BS on which to perform ranging.

7. The method of claim 1, wherein selecting comprises selecting the BS based on at least one of a channel-to-interference-plus-noise ratio (CINR), a Received Signal Strength Indication (RSSI), a round trip delay (RTD), scheduling service support, available resources, or a Quality of Service (QoS) in addition to the ranging loading parameters.

8. The method of claim 1, wherein selecting comprises selecting the BS, from the candidate BSs, having the lowest of the received ranging loading parameters.

9. The method of claim 1, wherein receiving the ranging loading parameters comprises receiving an Uplink Channel Descriptor (UCD) having at least one of the ranging loading parameters.

10. The method of claim 1, wherein receiving the ranging loading parameters comprises receiving a Neighbor Advertisement (MOB_NBR-ADV) message having at least one of the ranging loading parameters.

11. A non-transitory computer-program product for selecting, by a mobile station, a base station (BS) for performing ranging operations, the computer-program product comprising a computer-readable medium having instructions stored thereon, the instructions being executable by one or more processors and the instructions comprising:

instructions for receiving one or more ranging loading parameters indicative of an amount of ranging traffic for one or more candidate BSs;

instructions for selecting the BS, from the candidate BSs, on which to perform ranging based, at least in part, on the ranging loading parameters, wherein the instructions for selecting comprise instructions for selecting a BS with at least one of the ranging loading parameters below a threshold value; and instructions for performing the ranging operations with the selected BS.

12. The computer-program product of claim 11, wherein the ranging loading parameters comprise one ranging loading parameter for each of the candidate BSs.

13. The computer-program product of claim 12, wherein the ranging loading parameter comprises a ranging loading factor representative of a number of used ranging slots divided by a number of available ranging slots.

14. The computer-program product of claim 12, wherein the ranging loading parameter comprises a number or a percentage of unused ranging slots.

15. The computer-program product of claim 11, wherein the ranging loading parameters comprise one ranging loading parameter for each ranging region of the candidate BSs and wherein the instructions for selecting the BS comprise instructions for selecting the BS and the ranging region of the BS on which to perform ranging based, at least in part, on the ranging loading parameters.

16. The computer-program product of claim 11, wherein the instructions for selecting the BS comprise:

instructions for determining whether a serving BS is ranging overloaded based on a ranging loading parameter for the serving BS;

instructions for selecting the serving BS as the BS on which to perform ranging if the serving BS is not ranging overloaded; and instructions for selecting a neighbor BS from the candidate BSs as the BS on which to perform ranging if the serving BS is ranging overloaded.

17. The computer-program product of claim 11, wherein the instructions for selecting comprise instructions for selecting the BS based on at least one of a channel-to interference-plus-noise ratio (CINR), Received Signal Strength Indication (RSSI), round trip delay (RTD), scheduling service support, available resources, or a Quality of Service (QoS) in addition to the ranging loading parameters.

18. The computer-program product of claim 11, wherein the instructions for selecting comprise instructions for selecting the BS, from the candidate BSs, having the lowest of the received ranging loading parameters.

19. The computer-program product of claim 11, wherein the instructions for receiving the ranging loading parameters comprise instructions for receiving an Uplink Channel Descriptor (UCD) having at least one of the ranging loading parameters.

20. The computer-program product of claim 11, wherein the instructions for receiving the ranging loading parameters comprise instructions for receiving a Neighbor Advertisement (MOB_NBR-ADV) message having at least one of the ranging loading parameters.

21. An apparatus for selecting a base station (BS) for performing ranging operations, comprising:

means for receiving one or more ranging loading parameters indicative of an amount of ranging traffic for one or more candidate BSs;

means for selecting the BS, from the candidate BSs, on which to perform ranging based, at least in part, on the ranging loading parameters, wherein the means for selecting comprises means for selecting a BS with at least one of the ranging loading parameter below a threshold value; and means for performing the ranging operations with the selected BS.

22. The apparatus of claim 21, wherein the ranging loading parameters comprise one ranging loading parameter for each of the candidate BSs.

23. The apparatus of claim 22, wherein the ranging loading parameter comprises a ranging loading factor representative of a number of used ranging slots divided by a number of available ranging slots.

24. The apparatus of claim 22, wherein the ranging loading parameter comprises a number or a percentage of unused ranging slots.

25. The apparatus of claim 21, wherein the ranging loading parameters comprise one ranging loading parameter for each ranging region of the candidate BSs and wherein the means for selecting the BS comprises means for selecting the BS and the ranging region of the BS on which to perform ranging based, at least in part, on the ranging loading parameters.

26. The apparatus of claim 21, wherein the means for selecting the BS comprises:

means for determining whether a serving BS is ranging overloaded based on a ranging loading parameter for the serving BS;

means for selecting the serving BS as the BS on which to perform ranging if the serving BS is not ranging overloaded; and means for selecting a neighbor BS from the candidate BSs as the BS on which to perform ranging if the serving BS is ranging overloaded.

27. The apparatus of claim 21, wherein the means for selecting comprises means for selecting the BS based on at least one of a channel-to-interference-plus-noise ratio (CINR), Received Signal Strength Indication (RSSI), round trip delay (RTD), scheduling service support, available resources, or a Quality of Service (QoS) in addition to the ranging loading parameters.

28. The apparatus of claim 21, wherein the means for selecting comprises means for selecting the BS, from the candidate BSs, having the lowest of the received ranging loading parameters.

29. The apparatus of claim 21, wherein the means for receiving the ranging loading parameters comprises means for receiving an Uplink Channel Descriptor (UCD) having at least one of the ranging loading parameters.

30. The apparatus of claim 21, wherein the means for receiving the ranging loading parameters comprises means for receiving a Neighbor Advertisement (MOB_NBR-ADV) message having at least one of the ranging loading parameters.

31. A mobile device comprising:

a receiver front end configured to receive one or more ranging loading parameters indicative of an amount of ranging traffic for one or more candidate base stations (BSs);

logic for selecting a base station (BS), from the candidate BSs, on which to perform ranging based, at least in part, on the ranging loading parameters, wherein the logic for selecting is configured to select a BS with at least one of the ranging loading parameters below a threshold value; and logic for performing the ranging operations with the selected BS.

32. The mobile device of claim 31, wherein the ranging loading parameters comprise one ranging loading parameter for each of the candidate BSs.

33. The mobile device of claim 32, wherein the ranging loading parameter comprises a ranging loading factor representative of a number of used ranging slots divided by a number of available ranging slots.

34. The mobile device of claim 32, wherein the ranging loading parameter comprises a number or a percentage of unused ranging slots.

35. The mobile device of claim 31, wherein the ranging loading parameters comprise one ranging loading parameter for each ranging region of the candidate BSs and wherein the logic for selecting the BS comprises logic for selecting the BS and the ranging region of the BS on which to perform ranging based, at least in part, on the ranging loading parameters.

36. The mobile device of claim 31, wherein the logic for selecting the BS is configured to determine whether a serving BS is ranging overloaded based on a ranging loading parameter for the serving BS, to select the serving BS as the BS on which to perform ranging if the serving BS is not ranging overloaded, and, if the serving BS is ranging overloaded, to select a neighbor BS from the candidate BSs as the BS on which to perform ranging.

37. The mobile device of claim 31, wherein the logic for selecting is configured to select the BS based on at least one of a channel-to-interference-plus-noise ratio (CINR), Received Signal Strength Indication (RSSI), round trip delay (RTD), scheduling service support, available resources, or a Quality of Service (QoS) in addition to the ranging loading parameters.

38. The mobile device of claim 31, wherein the logic for selecting is configured to select the BS, from the candidate BSs, having the lowest of the received ranging loading parameters.

39. The mobile device of claim 31, wherein the receiver front end is configured to receive an Uplink Channel Descriptor (UCD) having at least one of the ranging loading parameters.

40. The mobile device of claim 31, wherein the receiver front end is configured to receive a Neighbor Advertisement (MOB NBR-ADV) message having at least one of the ranging loading parameters.

41. A method for indicating, to a mobile station (MS), an amount of ranging traffic for a base station (BS), comprising:
   determining the amount of ranging traffic for the BS;
   transmitting a ranging loading parameter indicative of the amount of ranging traffic for the BS; and
   receiving a ranging request if the ranging loading parameter is below a threshold value.

42. The method of claim 41, wherein determining the amount of ranging traffic comprises dividing a number of used ranging slots by a number of available ranging slots for the BS.

43. The method of claim 41, wherein determining the amount of ranging traffic comprises determining a number or a percentage of unused ranging slots.

44. The method of claim 41, wherein determining the amount of ranging traffic comprises receiving the amount of ranging traffic or the ranging loading parameter for the BS from another BS along a backbone of a wireless communications network.

45. The method of claim 41, wherein the BS is a neighbor BS and wherein transmitting the ranging loading parameter comprises transmitting a Neighbor Advertisement (MOB_NBR-ADV) message having the ranging loading parameter for the neighbor BS.

46. The method of claim 41, wherein the BS is a serving BS and wherein transmitting the ranging loading parameter comprises transmitting an Uplink Channel Descriptor (UCD) having the ranging loading parameter for the serving BS.

47. The method of claim 41, wherein the ranging request comprises one of a Ranging Request (RNG-REQ) message and a code-division multiple access (CDMA) ranging code.

48. A non-transitory computer-program product for indicating, to a mobile station (MS), an amount of ranging traffic for a base station (BS), the computer program product comprising a computer-readable medium having instructions stored thereon, the instructions being executable by one or more processors and the instructions comprising:
   instructions for determining the amount of ranging traffic for the BS;
   instructions for transmitting a ranging loading parameter indicative of the amount of ranging traffic for the BS; and
   instructions for receiving a ranging request if the ranging loading parameter is below a threshold value.

49. The computer-program product of claim 48, wherein the instructions for determining the amount of ranging traffic comprise instructions for dividing a number of used ranging slots by a number of available ranging slots for the BS.

50. The computer-program product of claim 48, wherein the instructions for determining the amount of ranging traffic comprise instructions for determining a number or a percentage of unused ranging slots.

51. The computer-program product of claim 48, wherein the instructions for determining the amount of ranging traffic comprise instructions for receiving the amount of ranging traffic or the ranging loading parameter for the BS from another BS along a backbone of a wireless communications network.

52. The computer-program product of claim 48, wherein the BS is a neighbor BS and wherein the instructions for transmitting the ranging loading parameter comprise instructions for transmitting a Neighbor Advertisement (MOB_NBR-ADV) message having the ranging loading parameter for the neighbor BS.

53. The computer-program product of claim 48, wherein the BS is a serving BS and wherein the instructions for transmitting the ranging loading parameter comprise instructions for transmitting an Uplink Channel Descriptor (UCD) having the ranging loading parameter for the serving BS.

54. The computer-program product of claim 48, wherein the ranging request comprises one of a Ranging Request (RNG-REQ) message and a code-division multiple access (CDMA) ranging code.

55. An apparatus for indicating, to a mobile station (MS), an amount of ranging traffic for a base station (BS), comprising:
   means for determining the amount of ranging traffic for the BS;
   means for transmitting a ranging loading parameter indicative of the amount of ranging traffic for the BS; and
   means for receiving a ranging request if the ranging loading parameter is below a threshold value.

56. The apparatus of claim 55, wherein the apparatus is the BS.

57. The apparatus of claim 55, wherein the means for determining the amount of ranging traffic comprises means for dividing a number of used ranging slots by a number of available ranging slots for the BS.

58. The apparatus of claim 55, wherein the means for determining the amount of ranging traffic comprises means for determining a number or a percentage of unused ranging slots.

59. The apparatus of claim 55, wherein the means for determining the amount of ranging traffic comprises means for receiving the amount of ranging traffic or the ranging loading parameter for the BS from another BS along a backbone of a wireless communications network.

60. The apparatus of claim 55, wherein the BS is a neighbor BS and wherein the means for transmitting the ranging loading parameter comprises means for transmitting a Neighbor Advertisement (MOB_NBR-ADV) message having the ranging loading parameter for the neighbor BS.

61. The apparatus of claim 55, wherein the BS is a serving BS and wherein the means for transmitting the ranging loading parameter comprises means for transmitting an Uplink Channel Descriptor (UCD) having the ranging loading parameter for the serving BS.

62. The apparatus of claim 55, wherein the ranging request comprises one of a Ranging Request (RNG-REQ) message and a code-division multiple access (CDMA) ranging code.

63. A first base station (BS) for indicating, to a mobile station (MS), an amount of ranging traffic for a second BS, comprising:
  logic for determining the amount of ranging traffic for the second BS;
  a transmitter front end configured to transmit a ranging loading parameter indicative of the amount of ranging traffic for the second BS; and
  a receiver front end configured to receive a ranging request if the ranging loading parameter is below a threshold value.

64. The first BS of claim 63, wherein the first BS is the second BS.

65. The first BS of claim 63, wherein the logic for determining the amount of ranging traffic is configured to divide a number of used ranging slots by a number of available ranging slots for the BS.

66. The first BS of claim 63, wherein the logic for determining the amount of ranging traffic is configured to determine a number or a percentage of unused ranging slots.

67. The first BS of claim 63, wherein the logic for determining the amount of ranging traffic is configured to receive the amount of ranging traffic or the ranging loading parameter for the second BS from the second BS along a backbone of a wireless communications network.

68. The first BS of claim 63, wherein the second BS is a neighbor BS and wherein the transmitter front end is configured to transmit a Neighbor Advertisement (MOB_NBR-ADV) message having the ranging loading parameter for the neighbor BS.

69. The first BS of claim 63, wherein the first BS is a serving BS and wherein the transmitter front end is configured to transmit an Uplink Channel Descriptor (UCD) having the ranging loading parameter for the serving BS.

70. The first BS of claim 63, wherein the ranging request comprises one of a Ranging Request (RNG-REQ) message and a code-division multiple access (CDMA) ranging code.

* * * * *